March 31, 1970 E. L. IRWIN ET AL 3,504,114

PHOTOSENSITIVE IMAGE SYSTEM

Filed Feb. 24, 1969 2 Sheets-Sheet 1

INVENTORS
EDGAR L. IRWIN
PIETER DE WIT

BY Ernest P. Klipfel
ATTORNEY

INVENTORS
EDGAR L. IRWIN
PIETER DE WIT

BY Ernest P. Klipfel
ATTORNEY

United States Patent Office 3,504,114

Patented Mar. 31, 1970

3,504,114

PHOTOSENSITIVE IMAGE SYSTEM

Edgar L. Irwin, Glen Burnie, and Pieter de Wit, Baltimore, Md., assignors to Westinghouse Electric Corporation, Pittsburgh, Pa., a corporation of Pennsylvania Filed Feb. 24, 1969, Ser. No. 801,503
Int. Cl. H04n 3/14
U.S. Cl. 178—6 12 Claims

ABSTRACT OF THE DISCLOSURE

In an array of photosensitive bistable switching elements, the elements of each row are connected for successively switching from a non-conductive to a conductive state in response to a read-out pulse applied to the row, and upon switching of the next preceding element. The rows are read-out in sequence. A common output circuit for all elements of the array receives an output pulse upon switching of each element, the amplitude of which is an inverse function of the illumination incident on that element. A display system sequentially scans through a plurality of displaced scan lines at a rate corresponding to the propagation rate of the read-out pulse through the elements of corresponding rows of the array and responds to the output pulses of the array in timed relationship to the scanning rate for reproducing and displaying an image corresponding to the pattern of illumination incident on the array.

BACKGROUND OF THE INVENTION

Field of the invention

This invention relates to an array of photosensitive switching elements for use in an image system and, more particularly, to such an array of improved structure and operation, providing high density packing of the elements with individual read-out of each element, for attaining a high level of resolution while maintaining a high level of light sensitivity of the individual elements.

State of the prior art

Arrays or mosaics of photosensitive elements are known in the prior art, and have been proposed for use in image systems. The photosensitive elements may comprise conventional vacuum tube photocells or solid state devices. Solid state arrays afford higher density packing of the photosensitive elements and thus greater resolution than arrays employing vacuum tube photocells.

These solid state elements are typically of the thyristor type, and may be switched between non-conducting and conducting states in response to an electrical pulse of an amplitude exceeding the break-over voltage of the thyristor. The break-over voltage for a given device varies inversely with the level of illumination, or number of photons, incident on the element. An electrical output signal is generated by a given element upon switching, the amplitude of which is indicative of the level of incident illumination.

The resolution capable of being achieved with prior art arrays of even the solid state type, however, is reduced due to connections which must be made to the individual elements of the array for read-out, or interrogation of the elements. The electrical connections to the elements required in the prior art systems for applying the read-out pulses and for receiving the output signals reduce the resolution of the arrays by obscuring the light sensitive elements. To improve the resolution of prior art arrays, the individual elements have been reduced in size so as to avoid obscuring of the elements by the interconnections. Such reductions in size, however, reduce the sensitivity of the array. Further, prior art arrays have required complex logic circuitry to read the information out of the array and process this signal information for utilization in a display device.

The photosensitive image system of the invention overcomes these and other problems of prior art photosensitive image systems, and particularly provides a photosensitive array which avoids the necessity of the undesirable interconnections required in prior art arrays. High resolution with great sensitivity is thereby attained. The array also permits the use of a simplified read out system which avoids the complex logic circuits required for prior art systems.

SUMMARY OF THE INVENTION

The sensor system of the invention employs an array of photosensitive switching elements provided in a common substrate, each of the elements having a first stable state of non-conduction and a second stable state of conduction. The elements have common switching characteristics for switching between the first and second states, the potential level of a switching pulse applied to the element required for effecting this switching being a function of the illumination incident upon the individual elements. The elements are arranged in a matrix of plural rows, each row including a plurality of series connected switching elements.

The switching elements may comprise light sensitive, multi-layer solid state elements such as thyristors. Preferably, the thyristors are developed, by conventional techniques, in a common substrate in closely spaced relationship. The series connection of the elements of each row is effected by suitably interconnecting the output of a first element with the input of the next successive element in the row. An input connection to the row is made to the power input of the first element of the row. A common output connection for all elements of the array is employed, and may comprise a conducting surface on the opposite side of the substrate from that in which the elements are developed. Alternatively, the common output plate may be provided in insulated, spaced relationship from the substrate adjacent the same surface as that of the elements.

A read-out or interrogation pulse is applied to the input connection of each row, and in sequence to the plurality of rows of the array. The read-out pulse is of sufficient amplitude to switch an element of the array from its non-conductive to its conductive state, even in the absence of incident illumination. As each element switches, an electrical pulse is capacitively coupled to the common output conductor. Since the potential level at which an element switches is a function of the intensity of illumination incident on that element, the amplitude of the pulse is a function of the level of illumination incident on the element thus switched. Upon switching to the conducting state, the element presents only minimal resistance, and due to the series interconnection of the elements of the row, the potential of the read-out pulse is applied to the next succeeding element of the row. The read-out pulse thereby propagates down the row, causing each element to switch in succession. There is thus produced in the common output circuit a train of output pulses varying in amplitude as a function of the variation in incident illumination on the elements of that row. Upon termination of the read-out pulse, all elements of the row being read-out are reset. All rows of the array are read out in this manner, in sequence, for repetitive read-outs of the array.

DETAILED DESCRIPTION OF THE INVENTION

The photosensitive array of the invention provides high resolution and high sensitivity as a result of the unique construction and read-out capability of the array. Particularly, although each element of the array is individually interrogated, or read-out, only a single input for each row of elements is required, and only a single output common to all elements of the array is required, whereby individual connections to each element of the array are eliminated. The elements of the array may thereby be closely spaced, or densely packed at the surface of the array, affording high resolution without loss of sensitivity. The simplified read-out system avoids the complex logic circuitry, such as required in prior art systems, for responding to and processing the signal information derived from the array for utilization in a display system.

Figure 1:
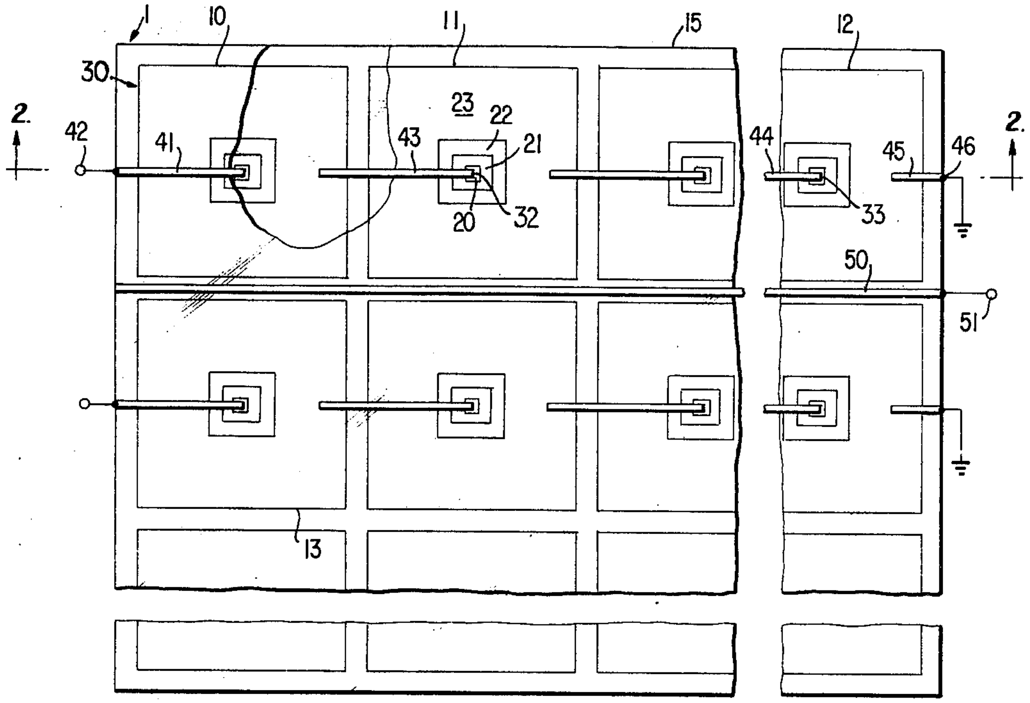
FIG. 1 comprises a plane view of a portion of the array of the invention.
Figure 2:
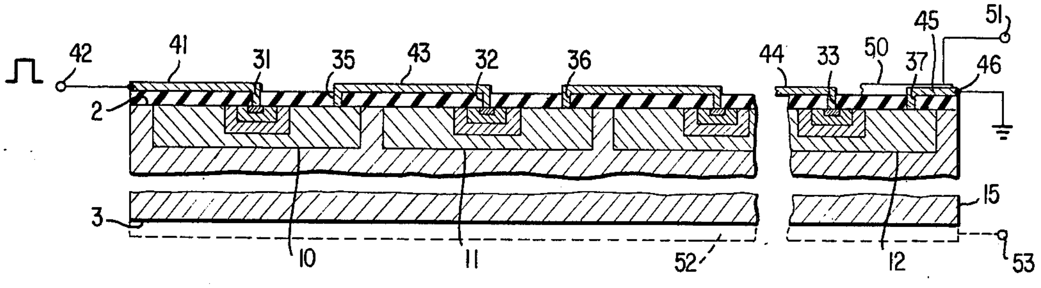
FIG. 2 comprises a cross-sectional view taken along line 2—2 of FIG. 1.

In FIG. 1 is shown a greatly enlarged view of a segment of an array 1 constructed in accordance with the invention. FIG. 2 is a cross-section of a portion of the array 1, taken along the line 2—2 of FIG. 1.

The photosensitive elements are developed as a plurality of isolated islands in a common substrate 15 by conventional diffusion techniques. The elements are located in a matrix configuration comprising a plurality of parallel rows of plural individual elements, with the corresponding elements of each row preferably aligned in columns. For example, the elements 10 and 11 comprise the first two elements of a first row of the array and the element 12 comprises the last element of that array. Element 13 is the first element of the second row of the array. Each of the elements comprises a multi-layer solid state device such as a photosensitive thyristor.

In the example of FIG. 1, the substrate 15 is of P-type material. Each of the thyristor elements is of identical construction, and, with reference to the element 11, includes a first region 20 of P-type material, a second region 21 of N-type material, a third region 22 of P-type material, and a fourth region 23 of N-type material. Each of the successive regions or layers is received as an island in the next successive region, and all regions terminate in a portion presented in a common planar surface 2 of the array. A portion of the substrate 15 extends to the common planar surface 2 and surrounds and thereby effectively isolates each of the thyristor elements from one another. Whereas PNPN-type thyristors are shown, it will be apparent that NPNP-types might be employed in the alternative, and that an N-type substrate would then be employed. The exact configuration of the regions of each element is not limited to that shown, and any suitable switching element having characteristics as described below may be employed in the array.

A layer 30 of substantially transparent insulating material is deposited on the planar surface 2 of the array 1. By use of conventional photoresist and etching procedures, various windows, to be described, are formed in the insulating layer 30 to expose at the surface 2 selected regions of the thyristors. In each of the rows, a first series of windows 31, 32, . . . and 33 is formed to expose the underlying, first P region 20, and a second series of windows 35, 36, . . . and 37 is provided to expose the underlying fourth N region of the thyristors 10, 11, . . . and 12, respectively. These first and fourth regions define the input and output of the element and between which the switching operation from non-conducting to conducting states is experieced.

After formation of the windows in the insulating layer 30, and through suitable deposition and masking techniques, a plurality of conductors is deposited on the array to provide a series interconnection of the thyristors within each row. For example, a first conductor 41 is deposited on the array and extends through the window 31 to provide connection to the N region 20 of the first thyristor 10 of the first row, and to a row input terminal 42. A second conductor 43 extends through the window 35 to the N region 23 of the first thyristor 10 and through the window 32 to the first P regions of the next successive thyristor 11 of the first row. The conductor 45 extends through the window 37 into contact with the region N of the last thyristor 12 of the first row, and is connected to a ground potential terminal 46. Preferably, the conductors are sintered to form an ohmic bond with the regions of the thyristor which they respectively contact. As explained in more detail in the description of operation which follows hereafter, the above-described conductors provide a series connection of the successive elements of each row of the array, between the row terminals 42 and 46.

A common output means is provided for all elements of the array. Alternative forms of this common output may be employed. A first form comprises an output plate 50 deposited on a small portion of the insulating layer 30, whereby it is capacitively coupled to each of the elements of the array. An output terminal 51 is connected to the plate 50. A second, alternative form of output common to all the elements of the array comprises a conducting layer or plate received on the lower surface 3 of the substrate 15 opposite to that of the surface 2 at which each of the thyristor elements is exposed. The plate 52 is similarly capacitively coupled to each of these elements and is connected to an output terminal 53.

Figure 3:
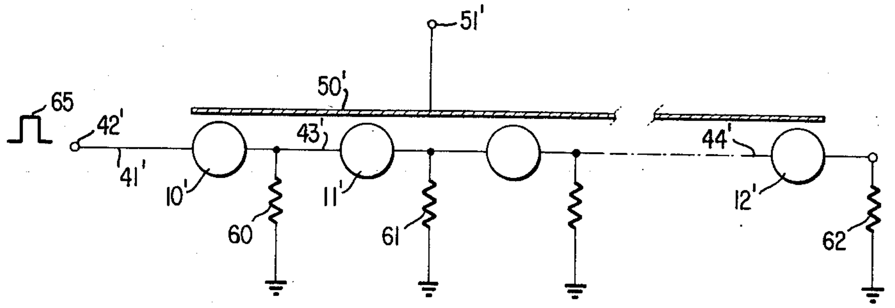
FIG. 3 comprises a schematic representation of the array of FIGS. 1 and 2.

The operation of the array is described with reference to the schematic representation of a single row of the array shown in FIG. 3. The elements 10′, 11′, . . . 12′ correspond to the thyristor elements 10, 11, . . . and 12 of the array in FIGS. 1 and 2. The input connection 41′ between the input terminal 42′ and the element 10′ corresponds to the connection provided by the conductor 41 in FIG. 1. Similarly, the connections 43′ . . . and 44′ correspond to the conductors 43 . . . and 44 of FIGS. 1 and 2. The resistors 60, 61, . . . 62 represent the internal and inherent resistance of the thyristors, and provide a load resistance for the corresponding thyristors, across which a voltage is generated upon switching thereof. The common output plate 50′ may correspond to either of the elements 50 and 52 of FIG. 1 and is spaced from the switching elements 10′, 11′, . . . 12′ to represent the capacitive coupling therebetween. The plate 50′ is connected to an output terminal 51′.

All of the photosensitive thyristor elements are substantially of identical construction and therefore have common switching characteristics. Particularly, each presents a common breakover voltage at which the element switches from a first stable state of non-conduction to a second stable state of conduction in which the voltage across the element drops to a minimum sustaining level for conduction. Further, the breakover voltage for all elements varies in substantially identical manner as a function of the illumination incident on the elements.

In operation, a read-out, or interrogation pulse, shown at 65, is applied to the input terminal 42′ and thus is applied to the series connection of all of the elements of the first row, between the input terminal 42′ and ground potential. Initially, upon application of the pulse 65, none of the elements 10′, 11′, . . . 12′ is conducting. The pulse 65 therefore effectively appears across the first element 10′ of the row. The pulse 65 is substantially a square wave pulse and therefore has a fast rising, leading edge. The amplitude of the pulse 65 exceeds the breakover voltage of any one of the elements 10′, 11′, . . . 12′, and thus, even in the absence of incident illumination, the first device 10' will be switched to its conducting state, producing an output pulse effectively across the inherent load resistance 60. This pulse is capacitively coupled to the common output plate 50' and is supplied to the output terminal 51'. The amplitude of the breakover voltage of a given element is an inverse function of the level of illumination incident on that element. The output pulse therefore varies in amplitude in inverse proportion to the level of illumination incident thereon.

Once a given element has switched to the conducting state, its internal resistance drops to a minimal, and almost negligible value, whereby essentially the identical amplitude square pulse is applied to the next succeeding element of the row. Thus, when the element 10' has switched to the conducting state, the pulse 65 is applied to the next succeeding element 11' which undergoes a switching operation identical to that of the element 10'. In this manner, the pulse 65 propagates down the row of switching elements, causing each to switch in succession. As a result, by interrogating each row, a train of output pulses are capacitively coupled through the plate 50' to the output terminal 51', the amplitudes of which vary in inverse proportion to the illumination incident upon the corresponding switching elements of the row. The amplitude of each output pulse is essentially independent of the amplitude of the read-out or switching pulse 65, and is primarily determined by the characteristics of the thyristor, particularly the material constants thereof and the intensity of incident illumination. Similarly, the rate of propagation is dependent on the switching characteristics, the slowest rate of propagation being that for which no illumination is incident on any of the elements of a given row. The switching, or read out pulse 65 is of sufficient duration to equal or exceed the time duration corresponding to read out of all elements at the slowest rate of propagation. At the trailing edge of the pulse, the input terminal 42' returns to ground potential and all elements of that row of the array to which the pulse was applied return to their first, non-conductive state. With reference to FIG. 1, a pulse of similar wave shape and duration is then applied to the next row of the array to effect the successive read out of the elements of that row, and for each row in sequence until the entire array has been read out.

Figure 4:
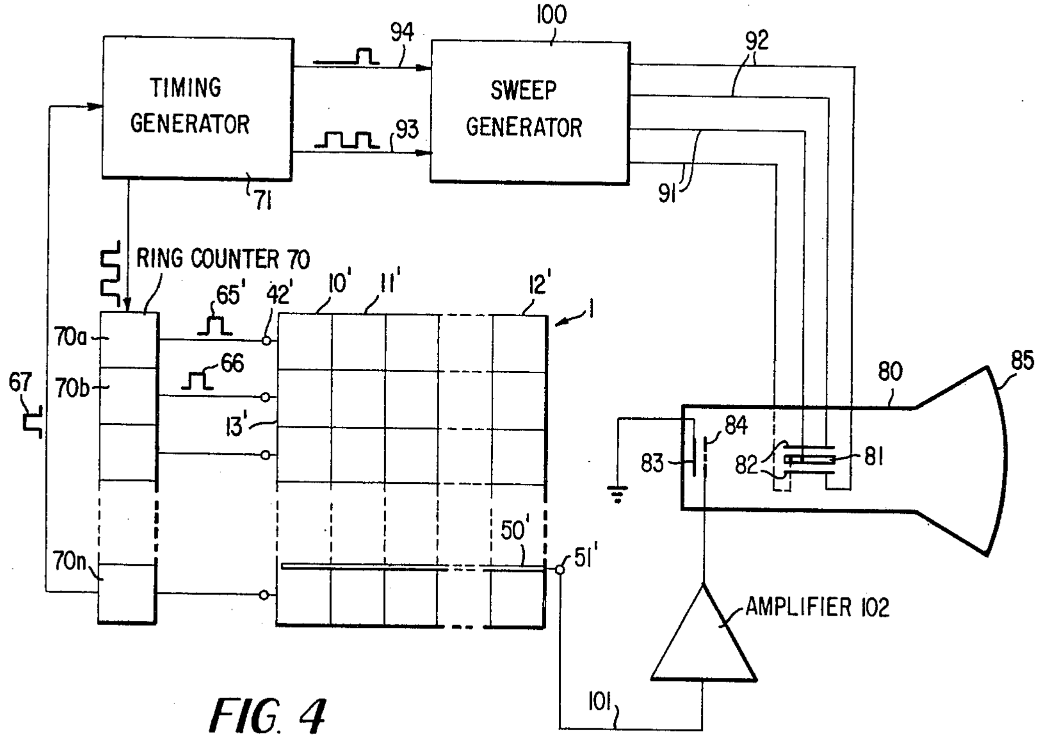
FIG. 4 comprises a block diagram of an image system in accordance with the invention and employing an array as disclosed in FIGS. 1 through 3.

In FIG. 4 is shown an image system employing the array 1 of FIG. 1, in which the individual elements 10', 11', . . . 12', 13' . . . , are shown in schematic form. Depending upon the resolution required, any desired number of individual elements may be provided in the array. Typically, an array of from 100 by 100 elements up to 300 by 300 elements may be employed. Each of the row input terminals, such as 42' is connected to a corresponding output stage of a ring counter 70. A timing generator 71 provides a train of clock pulses to the ring counter 70 to selectively set each of the successive stages **70*a*, 70*b*, . . . 70*n* thereof, in succession at a rate determined by the repetition rate of the clock pulses. As each stage of the ring counter is set, it produces an output pulse, represented by the interrogation pulse 65, at the output of the first stage 70*a*, which is applied to a corresponding row input terminal, such as the terminal 42' for the first row of the array. As noted previously, the duration of the read out or interrogation pulses corresponds to the time required for the pulse to propagate through all elements of a single row of the array. The clock pulses are spaced in time such that the next successive clock pulse resets the preceding, previously set stage, and sets the next successive stage of the ring counter. Thus, stage 70*b* produces an interrogation pulse 66, the leading edge of which follows closely in time the trailing edge of the preceding interrogation pulse 65'. Successive stages of the ring counter are set and subsequently reset in this manner to effect selective, sequential read out of the rows of the array. Upon reset of the last stage 70*n* of the ringer counter 70, a cycle or period pulse, shown at 67, is produced and supplied to the timing generator. Each occurrence of the pulse 67** thus indicates completion of one scan of the array.

The image display system may include a conventional cathode ray oscilloscope 80 having, for example, horizontal deflection plates 81 and vertical deflection plates 82. A conventional gun structure includes a cathode 83 connected to ground and a beam intensity control grid 84. The horizontal deflection plates 81 are connected through corresponding leads 91 to a sweep generator 100, and the vertical deflection plates 82 are connected through corresponding leads 92 to the sweep generator 100. The clock pulse output produced by timing generator 71 is also applied through lead 93 to the sweep generator 100 to define the horizontal sweep intervals and a cycle pulse output corresponding to the cycle pulse 67 is supplied by the timing generator 71 through lead 94 to the sweep generator 100 to define the vertical sweep intervals.

The sweep generator 100 responds to the vertical interval pulses to provide a sawtooth deflection voltage on the output leads 92 which is applied to the vertical deflection plates 82 for controlling the vertical deflection of the scanning beam. The sawtooth wave is designed to effect complete scanning of the display screen 85 of the oscilloscope 80 at a rate corresponding to the repetition rate of the vertical interval pulses, and thus corresponding to the rate of read out of all rows of the array. The sweep generator similarly provides a sawtooth deflection voltage on the output leads 91 in response to each of the horizontal interval pulses which is applied to the horizontal deflection plates 81 to effect horizontal deflection of the scanning beam at a rate corresponding to the propagation rate of the read out pulses through each row of the array.

The common output plate 50' is conected at its output terminal 51' through lead 101 to an amplifier 102. The amplifier 102 responds to the pulse outputs produced by the switching of successive elements of the array to supply a beam intensity control signal on its output lead 103 which is applied to the beam control electrode 84 of the oscilloscope 80. The amplifier may appropriately shape the pulses or provide a varying amplitude signal corresponding to the amplitude variations of successive pulses to provide continuous beam control. Appropriate blanking pulses are also supplied to the beam intensity control electrodes by conventional means, not shown. Thus, the intenstiy of the beam and the resultant illumination of the display screen 85 is controlled as a function of the illumination incident on the individual elements of the array 1 for each position of the beam corresponding to the location of each of those elements within the array 1. The image displayed on the screen 85 will thus provide a visual reproduction of the pattern of the levels of illumination incident on the array 1.

We claim as our invention:

1. An image system comprising:

an array of photosensitive switching elements, said elements having common switching characteristics for switching between a first stable state of nonconduction and a second stable state of conduction, and being responsive to the level of incident illumination to vary the level at which said switching occurs, means effecting series interconnections of said elements, interrogating means for successively switching the first of said series interconnected elements, and each successive one thereof in response to switching of a preceding element, to said second stable state, and means for deriving an output pulse in response to switching of each of said elements, the output pulses varying in ampiltude as a function of the level of illumination incident on the corresponding switching elements.

2. An image system as recited in claim 1 wherein said last named means comprises a common output means coupled to each of said elements of said array and connected to a common output terminal of said array for conducting said output pulses to said common output terminal.

3. An image system as recited in claim 1 wherein:
each of said elements includes an input and an output, the input of each successive element being connected to the output of the next preceding element for all series interconnected elements and the input of the first element thereof and the output of the last element thereof being connected to said interrogating means.

4. An image system as recited in claim 1 wherein each of said elements comprises a photosensitive thyristor.

5. An image system as recited in claim 1 wherein each of said elements comprises a four region solid state device.

6. An image system as recited in claim 5 wherein:
said array includes a common substrate of P type material and
each of said elements comprises a PNPN solid state device formed as an isolated island in said substrate.

7. An image system as recited in claim 1 wherein:
said array includes a common substrate, each of said elements comprising a plural region solid state device formed as an isolated island in said substrate with the regions of each of said switching elements defining the power input and output thereof terminating in a common planar surface of said substrate, and an insulating layer over said common planar surface having windows formed therein to expose the input and output of each of said switching elements, and
said series interconnection means comprises conductor means received on said insulating layer and selectively extending through said windows to selectively connect the input of each successive series connected element with the output of the next preceding element.

8. An image system as recited in claim 7 wherein said output means comprises a conducting layer received on said insulating layer and spaced from said conductor means.

9. An image system as recited in claim 7 wherein said output means comprises a conducting layer received on the surface of said substrate opposite to said common planar surface.

10. An image system as recited in claim 1 wherein:
said array includes a plurality of rows of said elements, the elements of each row being series connected, and
said interrogating means includes means for sequentially interrogating said plurality of rows of said array.

11. An image system as recited in claim 1 wherein there is further provided:
a display system having a display screen, scanning means, and intensity control means,
said interrogating means includes control means for controlling the rate of sequential interrogation of said rows of said array, and
said scanning means of said display system is responsive to said control means for effecting scanning of said display screen in accordance with the interrogation of said rows of said array and said intensity control means of said display system is responsive to said output pulses provided on said output means of said array to effect display on said display screen of an image corresponding to the pattern of illumination upon said array.

12. An image system as recited in claim 11 wherein said scanning means effects scanning of said display screen at a rate corresponding to the rate of successive interrogation pulse of the plurality of series interconnected elements of each row of the array.

References Cited

UNITED STATES PATENTS

| | | | |
|---|---|---|---|
| 3,400,273 | 9/1968 | Horton | 178—7.1 X |
| 3,435,138 | 3/1969 | Borkan | 178—7.1 |
| 3,445,589 | 5/1969 | Taylor | 315—10 X |

RICHARD A. FARLEY, Primary Examiner

T. H. TUBBESING, Assistant Examiner

U.S. Cl. X.R.

178—7.1, 7.3; 315—10